United States Patent [19]

Yoshifumi et al.

[11] Patent Number: 4,931,538

[45] Date of Patent: Jun. 5, 1990

[54] COPOLYESTER AND POLYESTER RESIN COMPOSITION COMPRISING SAID COPOLYESTER

[75] Inventors: Murata Yoshifumi, Kitakanbara; Kaneda Teruhisa, Osaka; Hara Kazuo; Takamoto Katsunori, both of Kurashiki; Ohonishi Isao, Okayama; Yokota Shinichi, Kurashiki, all of Japan

[73] Assignee: Kuraray Co., Ltd., Kurashiki, Japan

[21] Appl. No.: 215,737

[22] Filed: Jul. 6, 1988

Related U.S. Application Data

[62] Division of Ser. No. 53,156, May 21, 1987, Pat. No. 4,772,652.

[51] Int. Cl.$^5$ ............................................. C08G 63/02
[52] U.S. Cl. ................... 528/292; 528/295.3; 528/300; 528/302; 528/303; 528/304; 528/308; 528/308.3; 528/308.6
[58] Field of Search ............... 528/272, 295.3, 300, 528/302, 303, 304, 308, 308.3, 308.6

[56] References Cited

U.S. PATENT DOCUMENTS

| | | | |
|---|---|---|---|
| 3,013,914 | 12/1961 | Willard | 36/77 R |
| 3,580,965 | 5/1971 | Brinkmann et al. | 525/176 |
| 3,594,450 | 7/1971 | Herwig et al. | 524/425 |
| 4,010,222 | 3/1977 | Shih | 264/523 |
| 4,172,859 | 10/1979 | Epstein | 428/402 |
| 4,211,678 | 7/1980 | Henry et al. | 8/4 |
| 4,257,937 | 3/1981 | Cohen et al. | 524/445 |
| 4,264,667 | 4/1981 | Murakami et al. | 428/195 |
| 4,461,871 | 7/1984 | Kometani et al. | 525/166 |
| 4,558,085 | 12/1985 | Lee | 524/299 |
| 4,582,895 | 4/1986 | Peerman et al. | 528/295.3 |
| 4,636,442 | 1/1987 | Beavers et al. | 428/480 |
| 4,772,652 | 9/1988 | Yoshifumi et al. | 529/394 |

FOREIGN PATENT DOCUMENTS

| | | |
|---|---|---|
| 0019575 | 5/1980 | European Pat. Off. . |
| 0029285 | 5/1981 | European Pat. Off. . |
| 0057495 | 1/1982 | European Pat. Off. . |
| 1694190 | 8/1971 | Fed. Rep. of Germany . |
| 2129162 | 10/1972 | France . |

*Primary Examiner*—Morton Foelak
*Assistant Examiner*—Sam A. Acquah
*Attorney, Agent, or Firm*—Kramer, Brufsky & Cifelli

[57] ABSTRACT

The present invention relates to a polyethylene terephthalate based copolyester modified by aliphatic dicarboxylic acid containing not less than 9 carbon atoms and poly(tetramethylene oxide)glycol, and to a polyester resin composition comprising said copolyester.

Said polyester resin composition exhibits excellent toughness, impact strength and moldability without harming the inherent characteristics of polyethylene terephthlate.

8 Claims, No Drawings

COPOLYESTER AND POLYESTER RESIN COMPOSITION COMPRISING SAID COPOLYESTER

This application is a division of application Ser. No. 053,156, filed May 21, 1987 now U.S. Pat. No. 4,772,652.

BACKGROUND OF THE INVENTION

The present invention relates to a copolyester with improved physical properties, particularly excelling in toughness, which is suited for molding.

The invention further relates to a resin composition comprising said copolyester, which is excellent in toughness, impact resistance and other mechanical properties, and moldability characteristics such as injection moldability.

Polyethylene terephthalate (hereinafter sometimes referred to briefly as PET) has been used in various applications. While this resin has the advantage of having a high secondary transition point and high melting point as compared with polybutylene terephthalate, which is also a thermoplastic polyester, it also has the disadvantage that when fully crystallized with its molecular chains a non-oriented state, it is brittle and unless reinforced with a reinforcing material such as glass fiber, shaped articles manufactured by injection molding or extrusion molding are not of practical value. To impart ductility of polyethylene terephthalate, there is the method comprising the addition of a metallic ion neutralisate of a copolymer of an α-olefin with an α,β-ethylenically unsaturated carboxylic acid (Japanese Patent Laid-open No. 52-84244) but the melt viscosity of the composition is markedly increased in this method so that trouble is encountered particularly in injection molding. Furthermore, the composition containing such a copolymer exhibits of discoloration on heating.

On the other hand, as a composition having sufficient toughness, a glass fiber-reinforced polybutylene terephthalate composition is known but this composition has the disadvantage of a low heat distortion temperature.

PET whether reinforced or not with glass fiber or other filler material does not possess a sufficiently high impact resistance and the problem of breakage of shaped articles in secondary processing and during transport is frequently encountered.

The general method for improving the impact resistance of PET, whether reinforced or not, comprises adding a certain elastomeric polymer to the PET. For example, Japanese Patent Publication No. 45-26223 discloses a copolymer of an α-olefin with a saturated aliphatic monocarboxylic acid vinyl ester as an impact strength improving agent for polyester resin. Japanese Patent Publication No. 45-26224 describes a copolymer of an acrylic ester with a conjugated diene as an impact strength improving agent for polyester resin. In Japanese Patent Publication No. 45-26225, there is disclosed an ionomer as an impact strength improving agent. However, shaped articles manufactured by the above-mentioned methods are still not fully satisfactory in impact strength.

Several other methods are known for improving the impact strength of unreinforced PET or reinforced PET. By way of example, Japanese Patent Laid-open No. 51-144452, No. 52-32045 and No. 53-117049 teach the technique of blending a polyester resin with a copolymer of an α-olefin with an α,β-unsaturated carboxylic acid glycidyl ester. The technique of using an ethylene copolymer as a third component in addition to the above-mentioned copolymer is disclosed in Japanese Patent Laid-open No. 58-17148 and No. 58-17151, and the technique of using polyphenylene sulfide as an additive component is described in Japanese Patent Laid-open No. 57-92044.

However, even these techniques are not fully capable of assuring sufficient impact strength.

Of all the plastics, aromatic polycarbonate is known to be the resin having the greatest impact resistance, and there was an early attempt to blend PET with this resin for improving the impact resistance of PET (Japanese Patent Publication No. 36-14035). More recently, U.S. Pat. No. 4,257,937, for instance, teaches the combination of a polyacrylate resin and an aromatic polycarbonate resin as an impact strength improving agent for polyester resin. By this method, a fairly high impact resistance has been obtained. Japanese Patent Laid-open No. 59-161460 shows that in improving the impact strength of PET with a polyacrylate resin and an aromatic polycarbonate resin, the concomitant use of poly(1,4-butylene terephthalate) results in a further remarkable improvement in impact strength. However, even by this method, the impact strength (Izod impact strength) of the product is simply approaching that of a PBT/ polyacrylate/ aromatic polycarbonate resin composition and does no exceed it.

The present inventors previously proposed the use of a PBT polyester in a predetermined proportion in combination with a PET polyester and disclosed that by modifying the blend with a metal salt of a certain carboxyl group-containing polymer, a shaped article with a very high impact strength can be obtained.

However, since this composition is prepared by blending the PET polyester with the PBT polyester at a high temperature, transesterification is liable to take place. Moreover, when molding scraps are pulverized and the resulting pellets are added to the molding material for reuse of the raw material, the high impact strength attainable with the virgin molding material cannot be obtained. Moreover, the composition has a further disadvantage in that the shaped article is either poor in surface gloss or not satisfactory in mold releasability.

Further, the conventional composition prepared by adding an elastomeric polymer to a polyester resin showed a decrease in impact strength when the shaped article was exposed to a high temperature for a long time.

On the other hand, it is known that the impact strength of a filler-reinforced polyester resin can be improved by blending a very large amount of an elastomer therewith (e.g. Japanese Patent Publication No. 59-30742). However, the incorporation of such a large amount of the elastomer results in the deterioration of the inherent heat resistance and mechanical strength of the polyester.

Japanese Patent Laid-open No. 53-102360 teaches that the addition of PBT to a filler-reinforced PET composition results in an improved resistance to warping. However, this blending does not provide for an increased impact strength.

The present inventors previously showed that the use of a PBT type polyester in a specified proportion in combination with a PET type polyester and the modification of the blend with a specified amount of a metal salt of a carboxyl group-containing polymer results in a very high product impact strength, with a notched Izod impact strength value exceeding 20 kg.cm/cm being sometimes obtained. However, since this composition is prepared by blending a PET type polyester with a PBT type polyester at a high temperature, transesterification takes place so that the heat resistance of the shaped article is poor. Moreover, as mentioned above, when molding scraps are pulverized and added to the virgin molding material for reclamation and reuse of the scraps, the high impact resistance achieved with the virgin material cannot be obtained.

The conventional glass fiber-reinforced polyethylene terephthalate referred to above has the disadvantage that its impact resistance decreases on prolonged exposure to high temperature and that satisfactory surface gloss and mold releasability cannot be achieved unless the mold temperature is set at a comparatively high level.

SUMMARY OF THE INVENTION

It is a first object of the invention to provide a novel tough polyester which has overcome the brittleness, a major disadvantage, of polyethylene terephthalate, and yet retaining the other excellent characterisitcs of polyethylene terephthalate, namely, high melting point, high rigidity, chemical resistance, mechanical properties and electrical characteristics.

It is a second object of the invention to provide a polyethylene terephthalate resin composition, whether filler-reinforced or not, which is able to give moldings with excellent surface gloss and good mold releasability even at low mold temperature without losing the above-mentioned beneficial properties of the polyester.

It is a third object of the invention to provide a polyester resin composition which has been markedly improved in impact resistance and in the decrease of impact resistance on prolonged exposure to high temperature while retaining the other excellent characteristics of the conventional polyethylene terephthalate.

It is a fourth object of the invention to provide a tough glass fiber-reinforced polyester composition which has been improved in brittleness without losing the excellent high heat distortion temperature and high regidity of the conventional glass fiber-reinforced polyethylene terephthalate composition.

The present invention relates, in a first embodiment, to a moldable copolyester consisting essentially of the structural units of the following formulas (I) to (IV):

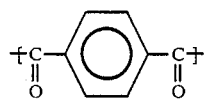 (I)

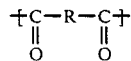 (II)

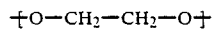 (III)

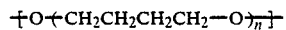 (IV)

wherein R is a divalent group available on elimination of carboxyl groups from an aliphatic dicarboxylic acid containing not less than 9 carbon atoms, and n is an integer equal to 8 through 84, wherein (I) is bound to (III) and/or (IV), (II) is bound to (III) and/or (IV), and the sum of moles of (I) and (II) is substantially equal to the sum of moles of (III) and (IV), and the proportion of (II) is 0.2 to 10 moles and that of the repeating unit $-(CH_2CH_2CH_2CH_2O)-$ of (IV) is 1 to 20 moles to each 100 moles of (I).

The present invention relates, in a second embodiment, to a polyester resin composition comprising (A) 100 parts by weight of the copolyester according to the first embodiment of the invention, (B) 0.05 to 20 parts by weight of a nucleating agent and (C) 0.1 to 10 parts by weight of a polyalkylene glycol of the general formula $R_1O-(R_2O)_{n1'}$ (wherein $R_1$ and $R_{1'}$ are H or $C_{1-10}$ alkyl, acyl or aroyl, $R_2$ is $C_{2-4}$ alkylene, n is a number not less than 5), and (D) 0 to 140 parts by weight of a reinforcing filler.

The present invention relates, in a third embodiment, to a polyester resin composition with improved impact resistance which comprises (A) 100 parts by weight of said copolyester of the first embodiment of the invention, (B) 3 to 100 parts by weight of a metal salt of a copolymer consisting of an α-olefin, an α, β-unsaturated carboxylic acid and optionally a third vinyl monomer, and, (C) 0 to 60 weight percent, based on the total composition, of a reinforcing filler.

DETAILED DESCRIPTION OF THE INVENTION

In undertaking research for toughening polyethylene terephthalate to overcome its brittleness, the present inventors set the restriction that said toughening should be accomplished without affecting the high melting and high rigidity features of polyethylene terephthalate in comparison with polybutylene terephthalate which is a polyester having relatively high toughness. The most outstanding feature of the copolyester according to the first embodiment of the invention resides in the very fact that toughness could be build into polyethylene terephthalate without substantially sacrificing the high melting point and high rigidity characteristics of the resin.

The present inventors attempted to impart ductility to polyethylene terephthalate by copolymerizing it with various polyalkylene glycols. The results were unsatisfactory, although some effects were observed with poly(tetramethylene oxide)glycol. Surprisingly, however, it was found that when polyethylene terephthalate was copolymerized with poly(tetramethylene oxide)-glycol and an aliphatic dicarboxylic acid containing not less than 9 carbon atoms or an ester derivative thereof, the inclusion of even a small proportion of such comonomers results in a marked improvement in elongation a break of substantially unoriented crystalline polyethylene terephthalate. This finding provided the basis for the first invention.

The factors responsible for the effect of addition of said aliphatic dicarboxylic acid containing not less than 9 carbon atoms remain yet to be elucidated but the following assumption may be advanced. Thus, whereas the copolymerization of polyethylene terephthalate with poly(tetramethylene oxide)glycol alone gives a polymerization reaction product with a coarse phase separation texture, the use of an aliphatic dicarboxylic acid containing not less than 9 carbon atoms gives a copolymer with a delicate particulate dispersed phase texture as observed by transmission electron microscopy of osmic acid-stained specimens. The present inventors consider that this alternation in phase separation pattern is associated with the observed improvement in ductility, that is the toughening effect.

The first embodiment of the invention will hereinafter be described in further detail.

The unit (I) of the copolyester according to the first embodiment of the invention is derived from terephthalic acid or an ester derivative thereof such as dimethyl terephthalate, diethyl terephthalate and so on. Within the range not detrimental to the effects of the invention, this unit (I) may be partially substituted by a dicarboxylic acid unit other than terephthalic acid and its ester derivatives.

The copolyester according to the first embodiment of the invention, (II) is a unit derived from an aliphatic dicarboxylic acid containing not less than 9 carbon atoms or an ester derivative thereof. With regard to the number of carbon atoms of said aliphatic dicarboxylic acid, the number of carbon atoms in the backbone chain between the carboxylic groups (not including the carbon atoms of the carboxyl groups) is not less than 7, and said backbone chain may have a branch chain or may partially form a ring. In the ring-forming aliphatic dicarboxylic acid, the number of carbon atoms between carboxyl groups means the smallest one. As examples of such aliphatic dicarboxylic acid containing not less than 9 carbon atoms, there may be mentioned linear dicarboxylic acids such as azelaic acid, sebacic acid, decanedicarboxylic acid, dodecanedicarboxylic acid, tetradecanedicarboxylic acid, hexadecanedicarboxylic acid, eicosanedicarboxylic acid, etc., dimer acids, hydrogenated dimer acids and their ester derivatives. These aliphatic dicarboxylic acids and ester derivatives can be used singly or in combination. The dicarboxylic acids particularly preferred for the purposes of the invention are dimer acids and hydrogenated dimer acids.

The dimer acids used in the invention are prepared from unsaturated fatty acids containing 18 carbon atoms, such as linolic acid and linolenic acid, or monohydric alcohol esters thereof and consist mainly of dimer acids containing 36 carbon atoms, although they contain minor amounts of monobasic acids and trimer acids. In order to accomplish the objects of the invention, it is preferable to use diamer acids lean in monobasic and trimer acids.

In the copolyester according to the first embodiment of the invention, the unit (II) is contained in a proportion of 0.2 to 10 moles, preferably not more than 5 moles, and for still better results, not more than 3 moles per 100 moles of unit (I). In the above range, the crystallized copolyester shows excellent ductility without a loss of high rigidity, with consequent high toughness. When the proportion is less than 0.2 moles, toughness is not improved as in the case with poly(tetramethylene oxide)glycol alone. When the proportion exceeds 10 moles, the melting point of the crystallized product is depressed too much and the rigidity is also sacrificed so that the objects of the first invention are not accomplished.

In the first embodiment of the invention, the modification by the above-mentioned proportion of unit (II) results in a remarkable improvement in the brittleness of the crystallized polyethylene terephthalate which is somewhat improved on modification with poly(tetramethylene oxide)glycol alone. This effect cannot be achieved with an aliphatic dicarboxylic acid containing less than 9 carbon atoms. There is virtually no upper limit to the number of carbon atoms of said aliphatic dicarboxylic acid.

The unit (III) of the copolyester according to the first embodiment of the invention is the unit derived from ethylene glycol.

The unit (IV) of the copolyester according to the first embodiment of the invention is the unit derived from poly(tetramethylene oxide)glycol. The use of poly(tetramethylene oxide)glycol as a comonomer is essential to the improvement in brittleness of substantially unoriented crystalline polyethylene terephthalate and it is preferable that the resulting copolymer contains 1 to 20 moles of the repeating unit $-(CH_2CH_2CH_2CH_2-O)-$ of poly(tetramethylene oxide)glycol per 100 moles of the terephthalic acid unit. When the proportion is less than 1 mole, it is not sufficient to attain an improvement in the brittleness of polyethylene terephthalate. When the proportion exceeds 20 moles, the rigidity and melting point of the crystalline product are depressed so that the objects of the invention cannot be accomplished. The proportion of this repeating unit is more preferably 3 to 15 moles and, for still better results, not more than 10 moles.

The molecular weight o poly(tetramethylene oxide)glycol must be in the range of about 600 to 6000 (degree of polymerization (n): 8-84). The use of poly(tetramethylene oxide)glycol having a molecular weight not within the above range is undesirable, for it will reduce the ductility of the composition. The more preferable range of molecular weight is about 600 to 2000 (degree of polymerization (n): 2 to 28).

In U.S. Pat. No. 4,211,678, poly(ethylene oxide)glycol is used in lieu of poly(tetramethylene oxide)glycol and this is copolymerized with terephthalic acid, ethylene glycol and dimer acids. However, copolyesters containing poly(ethylene oxide)glycol are poor in elongation at break and do not have the degree of toughness which is provided by the present invention.

In the production of the polyethylene terephthalate copolymer according to the first embodiment of the invention, there may be incorporated, within the range not detrimental to the effects of the invention, a small amount of additional monomers, for example polyfunctional monomers such as triols and tetraols, e.g. glycerol, trimethylolpropane, pentaerythritol, hexane triol 1,2,6, trimethylolethane, etc., benzenetricarboxylic acids such as trimellitic acid, trimesic acid, pyromellitic acid, etc., benzenetetracarboxylic acids, polyhydroxycarboxylic acids containing 3 to 4 hydroxyl groups and carboxylic groups and monofunctional monomers such as aliphatic monocarboxylic acids, e.g. stearic acid, oleic acid, etc. and aromatic monocarboxylic acids, e.g. benzoic acid, phenylacetic acid, diphenylacetic acid, 8-naphthoic acid and so on.

The copolyester according to the first embodiment of the invention can be produced by the conventional method which is generally used in the production of polyesters. Generally, the polyethylene terephthalate copolymer is produced by heating a mixture of reactants in the presence or absence of a catalyst at atmospheric or superatmospheric pressure in an inert gaseous atmosphere. The reaction temperature is in the range of 200° C. to 270° C. and, preferably, in the range of 230° C. to 260° C. After completion of the reaction, the resulting oligomer is subjected to polycondensation. This polycondensation reaction is carried out in the presence of a known catalyst such as antimony, titanium, iron, zinc, cobalt, lead, manganese and germanium catalysts at a pressure of 15 mmHg or less, preferably not more than 1 mmHg, in the temperature range of about 270° C. to about 300° C.

The poly(tetramethylene oxide)glycol and said aliphatic dicarboxylic acid containing not less than 9 carbon atoms or ester derivative thereof can be added before or during the transesterification or esterification reaction but they are preferably added after the transesterification or esterification reaction, that is to say in the condensation stage.

The intrinsic viscosity of the copolyester according to the first embodiment of the invention as determined in a 50:50 (w/w) mixture of phenol and tetrachloroethane at 30° C. is in the range of about 0.5 to about 1.5 and, preferably, in the range of about 0.5 to about 1.0.

The $^1$H-NMR spectrum (500 MHz) of the copolyester according to the first embodiment of the invention shows a peak due to ethylene glycol attached to the aliphatic dicarboxylic acid aside from the peak of ethylene glycol attached to terephthalic acid and a peak not observed with poly(tetramethylene oxide)glycol because of the formation of ester bonds at the terminal hydroxyl groups of poly(tetramethylene oxide)glycol, indicating that both the aliphatic dicarboxylic acid and poly(tetramethylene oxide)glycol have been linked to the polymer chain by ester linkages to form an ethylene terephthalate copolymer. This copolyester according to the first embodiment of the invention has excellent toughness in addition to the high melting point and high rigidity features of polyethylene terephthalate as such and is suitable for use as a raw material for film, sheet and other shaped articles.

The copolyester of the first embodiment of the invention which possess the above-mentioned high toughness plus the high melting point and high rigidity features of polyethylene terephthalate can be further formulated with other components to give resin compositions possessing very desirable performance characteristics as described hereinafter.

The second embodiment of the invention is predicated on the finding that the addition of a nucleating agent and a polyalkylene glycol compound to the copolyester of the first invention gives a polyester resin composition which undergoes sufficient crystallization even at a low mold temperature not more than 100° C. Furthermore, the resulting polyester resin composition can be blended with a reinforcing filler such as glass fiber to give a reinforced polyester resin composition having superior heat resistance and rigidity. Generally, the incorporation of a reinforcing filler results in a marked decrease in toughness in terms of tensile elongation, etc. as compared with the unreinforced composition. However, even at the usual incorporation level of 30 to 40 weight percent of the reinforcing filler, the polyester resin composition according to the second embodiment of the invention was found to exhibit excellent toughness as compared with the conventional filler-reinforced polyester resin composition.

The copolyester of the first invention can be used as copolyester (A) used in the second embodiment of the invention.

The nucleating agent (B) used in the second embodiment of the invention may be selected from among the materials which are generally used as nucleating agents for polyethylene terephthalate copolyesters. For example, inorganic nucleating agents such as neutral clay, e.g. talc, oxides, sulfates or silicates of Group II metals such as zinc oxide, magnesium oxide, calcium silicate, magnesium silicate, calcium sulfate, barium sulfate, etc., and organic nucleating agents such as monovalent or divalent metal salts of organic carboxylic acids containing 7 to 54 carbon atoms or carboxyl group-containing polymers may be mentioned.

The research conducted by the present inventors has revealed that by a synergistic effect of polyalkylene glycol, the use of an organic nuleating agent gives a composition having high toughness and assuring a markedly improved molded surface. As exemplary species of said organic nucleating agents, there may be mentioned Group Ia or Group IIa metal salts of organic carboxylic acids containing 7 to 54, preferably 7 to 25, carbon atoms, such as sodium stearate, calcium stearate, sodium pelargonate, sodium behenate, sodium benzoate, calcium benzoate, sodium terephthalate, lithium terephthalate, etc., and Group Ia or Group IIa metal salts of copolymers of α-olefins of 2 to 5 carbon atoms, such as ethylene, propylene, etc., with α, β-unsaturated carboxylic acids such as acrylic acids, methacrylic acids and the like or copolymers of aromatic olefins with α, β-unsaturated carboxylic acids, such as styrene-maleic anhydride copolymer and the like. Examples of said Group Ia or Group IIa metals include sodium, potassium, lithium, calcium and the like. Of the above-mentioned nucleating agents, the sodium or potassium salts of carboxyl group-containing polymers are preferred in the sense that the viscosity drop of the polyester is small at molding. In the above-mentioned copolymers, α-olefins or aromatic olefins preferably account for 50 to 98 weight percent and more preferably 80 to 98 weight percent. Particularly preferred is the sodium salt of ethylene-methacrylic acid copolymer. This copolymer characteristically gives a composition assuring a very high degree of toughness.

Referring to the above-mentioned carboxyl group-containing polymers, it is not necessary that all the available carboxyl groups have been neutralized. The preferred degree of neutralization is 40% or more and more preferably 60% or more.

The proportion of said nucleating agent (B) is 0.05 to 20 parts by weight and preferably 0.1 to 10 parts by weight per 100 parts by weight of polyester resin (A). When the proportion exceeds 20 parts by weight, the mechanical properties of the moldings are sacrificed. When, conversely, the proportion is less than 0.05 part by weight, the moldabilty is not improved as much as desired.

As examples of the polyalkylene glycol (C) of the general formula:

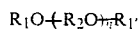

wherein $R_1$ and $R_{1'}$ each is a hydrogen atom or a $C_{1-10}$ alkyl, acyl or aroyl group; $R_2$ is a $C_{2-4}$ alkylene group; and n is a number not less than 5, which is used in the second embodiment of the invention, there may be mentioned polyethylene glycol, polypropylene glycol, polytetramethylene glycol, etc., their mono- or dialkyl ethers (for example, monomethyl or dimethyl ethers, monoethyl or diethyl ethers, monopropyl or dipropyl ethers and monobutyl or dibutyl ethers), mono- or dialkylates and mono- or diarylates (for example, monoacetylate, diacetylate, mono-2-ethylhexanoate, di-2-ethylhexanoate, monobenzoate, dibenzoate, etc.). In the second embodiment of the invention, it is preferable to use a polyalkylene glycol forming alkyl ethers at both ends in that the intrinsic viscosity of the polyester resin is then not decreased much at molding. The use of monoalkyl ethers or polyalkylene glycols having free hydroxyl groups at both ends results in a substantial reduction in intrinsic viscosity of the polyester resins at molding and to avoid this result, it becomes necessary to use a polyester resin having a higher degree of polymerization. The degree of polymerization (n) of said polyalkylene glycol (C) must not be less than 5. When n is less than 5, the polyalkylene glycol (C) tends to bleed on the surface of the molding. The proportion of polyalkylene glycol (C) is 0.1 to 10 parts by weight and, preferably, 1 to 5 parts by weight per 100 parts by weight of copolyester (A). When the proportion exceeds 10 parts by weight, the rigidity of the molding is sacrificed. If the proportion is less than 0.1 part by weight, the moldability is not improved as much as desired.

The resin composition according to the second embodiment of the invention can be formulated with a reinforcing filler (D) and the resulting reinforced composition offers various excellent properties.

The reinforcing fillers which can be used may be fibrous, sheet-like or granular or of a mixed type. As examples of fibrous fillers, there may be mentioned inorganic fibers such as glass fiber, carbon fiber, graphite fiber, metal fiber, silicon carbide fiber, asbestos fiber, wallastonite fiber, potassium titanate fiber, etc., whiskers, and various organic fibers. There is virtually no limitation on the type of fiber that can be used but a suitable one is selected in accordance with the desired object, such as improvement in mechanical properties, heat resistance, electrical conductivity, frictional characteristics, flame retardation and so on.

As examples of said sheet-like or granular fillers, there may be mentioned mica (muscovite, phlogopite, etc.), sericite, clays, sheet glass(glass flake), glass bead, talc, metal foil and so on.

The addition of sheet-like materials alone is effective against deformation but in order to assure high mechanical strength and good dimensional stability with little curling, they can be more advantageously used in combination with fibrous fillers.

While these fibrous, sheet-like and granular reinforcing fillers can be used singly or in combination, it is preferable to use at least a fibrous filler as an essential component.

In the practice of the second embodiment of the invention, use of glass fiber is advantageous. This glass fiber may be an ordinary glass fiber which is commonly used for reinforcement of plastics and while its diameter is not critical, it is preferably in the range of 3 to 30 $\mu$. Depending on the production process, various forms such as rovings and chopped strands can be employed. Moreover, the glass fiber is preferably subjected to silanation, chrome-treatment or the like for improved adhesion to the plastic material.

The proportion of said reinforcing filler, such as glass fiber, is generally not more than 140 parts by weight per 100 parts by weight of the copolyester. Particularly when 5 parts by weight or more of glass fiber is incorporated in the resin composition of the second embodiment of the invention, the heat distortion temperature of the composition is increased to a level as high as that of the ordinary glass fiber-reinforced polyester resin compositions.

Moreover, even when a large amount of glass fiber is incorporated, the composition of the second embodiment of the invention characteristically assures a very high degree of toughness as compared with the conventional glass fiber-reinforced polyester compositions. In order to obtain a composition which assures both a high degree of toughness and a high heat distortion temperature, glass fiber is used in a proportion of 10 to 100 parts by weight per 100 parts by weight of the polyester resin.

Since the composition according to the second embodiment of the invention shows a high rate of crystallization even at a comparatively low temperature, molding at a mold temperature of about 80° to 100° C., which is commonly used for the molding of general-purpose thermoplastic resins, results in a shaped article well and uniformly crystallized up to the surface layer and having an excellent surface gloss with good mold releasability even in a short in-mold residence time. Moreover, the resulting shaped article is not only excellent in dimensional stability with a minimum of curling but also shows high heat resistance, superior mechanical properties and a particularly high flexural modulus of elasticity.

In the third embodiment of the invention, a metal salt of an $\alpha$-olefin-$\alpha,\beta$-unsaturated carboxylic acid copolymer is added to the copolyester of the first invention, whereby the impact resistance of the shaped article is remarkably increased. Moreover, even when this shaped article is pulverized, the resulting powder blended with the unmolded raw material, and the mixture molded, there is surprisingly obtained a shaped article having a high impact strength comparable to that of a shaped article molded from the virgin material. It is also surprising that such shaped articles retain high impact strength even after prolonged exposure to a high temperature, e.g. 150° C. Moreover, an injection-molded product having a very satisfactory surface gloss can be obtained with good mold releasability even at a comparatively low mold temperature for PET resin compositions. In addition, even when a reinforcing filler is incorporated, the resulting product fully retains the inherent properties (such as heat resistance and mechanical strength) of the filler-reinforced polyethylene terephthalate resin composition.

As the copolyester (A) in the third embodiment of the invention, the copolyester of the first embodiment of the invention can be used as is. The high impact strength of the composition of the third embodiment of the invention is derived from the presence of the above copolyester in the composition.

In accordance with the third embodiment of the invention, a metal salt of a copolymer of an $\alpha$-olefin with an $\alpha,\beta$-unsaturated carboxylic acid and, if necessary, further with a third vinyl monomer (this copolymer is sometimes referred to as the ionomer) (B) is incorporated in the resin composition As examples of the $\alpha$-olefin unit of said ionomer, there may be mentioned ethylene, propylene and the like. As examples of said $\alpha,\beta$-unsaturated carboxylic acid, there may be mentioned acrylic acid, methacrylic acid, maleic acid, fumaric acid, itaconic acid and the like. The third vinyl monomer includes, among others, ethyl acrylate, vinyl acetate and the like. The metal may be a mono- to trivalent metal and is preferably sodium, potassium, calcium, zinc or aluminum.

It has been found that when an alkali metal such as sodium is selected as said metal, not only is a remarkably high impact strength obtained but this high impact strength is retained even after prolonged exposure to high temperature. According to the results of investigations by the present inventors, such a characteristic phenomenon is observed only when a very special type of copolyester such as the one described herein is used as the copolyester (A).

When zinc is selected as the metal, a resin composition with a minimum of coloration is obtained and it has been confirmed that such composition is not readily discolored even on prolonged exposure to high temperature.

The above ionomer can be produced by copolymerizing an α-olefin with an α,β-unsaturated carboxylic acid and, if necessary, further with a third vinyl monomer as aforesaid and, then, substituting some or all of the carboxylic acid with a metal salt. As an alternative production process for the ionomer, one may graft-polymerize an α,β-unsaturated carboxylic acid to a polymer or copolymer consisting of α-olefin units and optionally a third vinyl monomer and, then, carry out the substitution with a metal salt. As a further alternative, one may copolymerize an α-olefin with an α,β-unsaturated carboxylic ester and, if necessary, further with a third vinyl monomer, hydrolyze the carboxylic ester bonds and, then, carry out the substitution with a metal salt. Any of the ionomers prepared by these methods can be used in the third embodiment of the invention. A particularly preferred ionomer is a metal salt of an ethylene-acrylic acid or ethylene-methacrylic acid copolymer. Such ionomers can be readily obtained from many sources, e.g. Mitsui Chemical Co. which supplies HI-MILAN.

In the above ionomer, the carboxylic acid unit (inclusive of the salt thereof) of the copolymer should account for 1 to 30 mole percent of the total copolymer. If the proportion is less than 1 mole percent, the impact strength of the polyester resin is not improved as much as desired When the proportion exceeds 30 mole percent, the ionomer cannot be easily blended with the polyester in the molten state in a short amount of time. The preferred proportion of the carboxylic acid unit in the ionomer in the third invention is 2 to 10 mole percent. In the third embodiment of the invention, it is not necessary that all the carboxyl groups in the ionomer have been neutralized by metal ions but, it is essential that at least 20 percent of all the carboxyl groups have been neutralized. When the degree of neutralization is less than 20 mole percent, the impact resistance of the polyester resin is not sufficiently improved. The preferred degree of neutralization is 40% or more and, for still better results, 60% or more.

The degree of neutralization can be found by infrared absorption spectrometry of the copolymer. Thus, it can be estimated from the ratio of the $\nu C=O$ absorption intensity of the carboxyl groups forming salts to the $\nu C=O$ absorption intensity of unneutralized carboxyl groups.

The proportion of (B) is 3 to 100 parts by weight, preferably 5 to 50 parts by weight and, for still better results, 20 to 50 parts by weight per 100 parts by weight of the copolyester. When the proportion is less than 3 parts by weight, the impact strength of the shaped article is not improved as much as desired, while the use of more than 100 parts by weight results in poor mechanical properties of the shaped article.

In the third embodiment of the invention, a reinforcing filler (C) can be incorporated as desired. This reinforcing filler may be the same as the one used in the second embodiment of the invention. Particularly preferred for the purposes of the third embodiment of the invention is glass fiber and this glass fiber may be one of those employed in the second embodiment of the invention.

The proportion of the reinforcing filler is 0 to 60 weight percent, preferably 5 to 60 weight percent, and, more preferably, 10 to 50 weight percent based on the total weight of the composition. When the proportion is low, the resulting composition does not have a sufficient mechanical strength required of any reinforced polyester. When the proportion exceeds 60 weight percent, the fluidity of the composition decreases thereby interfering with the molding procedure. When the proportion of reinforcing glass fiber is within the range of 20 to 45 parts by weight, the composition according to the third embodiment of the invention has a particularly high impact strength, high heat distortion temperature and rigidity and is excellent in fluidity so that it is well balanced in properties.

The above-mentioned copolyester and ionomer are generally available in powdery or particulate forms (pellets, chips, etc.). The desired polyester molding can be manufactured by mere mix-melting and molding of these materials together with the reinforcing filler. However, the mixture can first be molded into pellets or chips and, then, these pellets or chips can be melt-molded. Therefore, the mixture of copolyester, ionomer and reinforcing filler in the third embodiment of the invention means not only a mere mixture of the respective powders, particles and fillers but also a mixture of such components prepared by mix-melting.

The composition thus obtained provides shaped articles having a very high impact strength which cannot be obtained from the conventional PET polyester resins and, moreover, exhibiting only a minimum of decrease in impact strength even on prolonged exposure to high temperature. Therefore, the invention contributes a great deal to the industry.

The above-mentioned copolyester and the composition comprising the copolyester, which are provided by the present invention, may be formulated with various additives which are commonly used in polyester compositions. For example, colors, mold releases, oxidation inhibitors, ultraviolet absorbers, flame retardants and so forth can be incorporated as required. Moreover, within the range not interfering with the effects of the invention, other resins such as other polyesters, polyolefins, acrylic resins, polycarbonates, polyamides, rubber-like elastomers and the like can be blended.

Further, the present copolyester and composition can not only be injection-molded but also molded by other techniques such as extrusion into a variety of shaped articles. Shaped articles which can be obtained by extrusion molding, include fibers, rods, films, sheets, plates, tubes and pipes, for instance. Moreover, by cutting such shaped articles, particulate or fragmentary molding materials such as chips and pellets can be produced as desired. By injection molding, articles of desired shapes can be manufactured according to the mold geometry employed. Whichever of these molding methods is employed, the resulting shaped articles can be easily processed into final products by secondary processes such as blow molding, drawing, vacuum molding and so on.

As uses for the copolyester and composition according to the present invention, there may be mentioned household utensils such as irons, hair-dryers, kitchenware, etc.; electrical and electronics parts such as coil bobbins, switches, connectors, etc.; machine parts such as gears, covers, etc.; and automotive parts such as under-bonnet parts, shells and so on.

The following examples are further illustrative of the present invention. Unless otherwise indicated, all parts are by weight.

EXAMPLE

Run 1 Synthesis of copolyester A

An esterification reactor heated with a heat medium at 260° C. was fed with a slurry composed of 1.5 kg (9.03 moles) of terephthalic acid, 0.67 kg (10.8 moles) of ethylene glycol, 0.69 g of antimony trioxide, and 0.13 g of phosphorous acid under pressure to carry out the esterification reaction. After the reaction mixture had become clear, the esterification was further continued until the carboxyl group content of the reaction system was decreased to 600 μeq/g. This reaction mixture was fed under pressure to a polymerization reactor, where 43 g of poly(tetramethylene oxide)glycol with a molecular weight of about 860, 43 g of dimeric acid (Versadyme 288, Henkel Japan) and 3.5 g of Irganox 1010 (Ciba-Geigy) were added. The jacket temperature of the polymerization reactor was increased to 280° C. and the internal pressure of the reactor was gradually decreased to 0.3 mmHg. The polymerization was conducted under these conditions for 60 minutes to give a copolyester. By means of a gear pump, the polymer was taken out in strand form from the nozzle, cooled with water and cut into pellets. The intrinsic viscosity of this polymer was 0.74 dl/g.

The above polymer was dissolved in hexafluoropropanol and analyzed by $^1$H-NMR at 500 MHz. The analysis showed that it contained 1.13 moles of dimer acid unit and 7.61 moles of poly(tetramethylene oxide)glycol unit per 100 moles of terephthalic acid unit.

By means of a hot press preheated to 280° C. the above copolyester was molded into a film with a thickness of about 50 μ and this film was quenched with water to give a substantially amorphous quenched film. When its melting temperature (Tm) was determined from the peak crystal melting temperature by DSC with a temperature incremental rate of 20° C./minutes. The Tm value was 249° C.

The copolyester pellets obtained as above were dried in vacuo at 120° C. for 12 hours. Then, the dried pellets were sandwiched between Teflon-coated iron plates with a 1 mm-thick spacer and were press-molded at 280° C. The molding was immediately transferred to a separate hot press pre-heated to 150° C., in which it was held for 5 minutes. The molding was finally cooled to give a 1 mm-thick sheet which was substantially non-oriented and fully crystallized.

From the above sheet, a tensile testpiece was prepared using a preheated No. 2 dumbell punch for rubber use.

This testpiece was subjected to a tensile test using an Instron universal tester at the pulling speed of 0.5 cm/min. at 23° C. The mean for 5 specimens (n=5) was calculated. The tensile characteristics of the product sheet are shown in Table 1.

Run 2

The esterification reaction between terephthalic acid and ethylene glycol was conducted in the same manner as Run 1 and the reaction mixture was transferred to a polymerization reactor, where 43 g of sebacic acid, 43 g of poly(tetramethylene oxide)glycol with a molecular weight of about 2000 and 3.5 g of Irganox 1010 (Ciba-Geigy) were added. Thereafter, the polycondensation reaction was conducted in the same manner as Run 1 to give pellets of a copolyester. The intrinsic viscosity of the copolyester was 0.72 dl/g.

The composition analysis by H-NMR spectrometry showed that this copolyester contained 2.81 moles of sebacic acid unit and 7.48 moles of poly(tetramethylene oxide)glycol unit per 100 moles of terephthalic acid.

Runs 3 to 15

The esterification reaction between terephthalic acid and ethylene glycol (butylene glycol in the case of copolyester N) at 260° C. Then, predetermined amounts of an aliphatic dicarboxylic acid and a poly(alkylene oxide)glycol were added and, by the same procedure as Run 1, the various copolyesters shown in Table 1 were produced.

TABLE 1

| Run No. | 1 | 2 | 3 | 4 | 5 | 6 | 7 | 8 | 9 |
|---|---|---|---|---|---|---|---|---|---|
| Copolyester | A | B | C | D | E | F | G | H | I |
| Aliphatic dicarboxylic acid | Dimer acid | Sebacic acid | Dimer acid | Dimer acid | Azelaic acid | — | Dimer acid | Dimer acid | Adipic acid |
| Molecular weight of poly(tetramethylene oxide)glycol | about 860 | about 2,000 | about 2,000 | about 2,000 | about 2,000 | about 2,000 | — | about 2,000 | about 2,000 |
| Aliphatic dicarboxylic acid content of copolyester (moles per 100 moles of terephthalic acid) | 1.1 | 2.8 | 0.23 | 1.1 | 3.0 | — | 0.89 | 4.0 | 3.1 |
| Tetramethylene oxide repeating unit content of copolyester (moles per 100 moles of terephthalic acid) | 7.6 | 7.5 | 7.7 | 10.2 | 7.4 | 7.6 | — | 24.8 | 6.5 |
| Intrinsic viscosity of copolyester (dl/g) | 0.74 | 0.72 | 0.76 | 0.84 | 0.65 | 0.74 | 0.68 | 0.90 | 0.65 |

| Run No. | 10 | 11 | 12 | 13 | 14 | 15 | 16 |
|---|---|---|---|---|---|---|---|
| Copolyester | J | K | L | M | N* | O | P |
| Aliphatic dicarboxylic acid | octadecanedicarboxylic acid | octadecanedicarboxylic acid | Dimer acid | Dimer acid | Dimer acid | Dimer acid | Dimer acid |
| Molecular weight of poly(tetramethylene oxide)glycol | about 1,500 | about 2,000 | about 2,000 | about 2,000 | about 2,000 | about 2,000 | PEG* 2,000 |
| Aliphatic dicarboxylic acid content of copolyester (moles per 100 moles of tere- | 1.4 | 1.7 | 2.3 | 6.1 | 0.84 | 12 | 1.1 |

TABLE 1-continued

| | | | | | | | |
|---|---|---|---|---|---|---|---|
| phthalic acid) | | | | | | | |
| Tetramethylene oxide repeating unit content of copolyester (moles per 100 moles of terephthalic acid) | 6.9 | 7.5 | 3.8 | 3.8 | 6.9 | 3.8 | — |
| Intrinsic viscosity of copolyester (dl/g) | 0.72 | 0.70 | 0.73 | 0.78 | 0.95 | 0.73 | 0.74 |

*Polybutyrene terephthalate polyester
*Poly(ethylene oxide)glycol

Run 17

By the polymerization procedure described in Run 1, pure polyethylene terephthalate with an intrinsic viscosity of 0.72 dl/g was prepared.

For each of the samples prepared in Runs 1 to 9, 11, 16 and 17, Tm was determined by DSC and the tensile test was performed in the same manner as Run 1. The results are shown in Table 2.

TABLE 2

| Run No. | Tm (°C.) | Young's modulus (kg/cm²) | Tensile strength at break (kg/cm²) | Elongation at break (%) |
|---|---|---|---|---|
| 1 | 249 | 17,000 | 650 | 110 |
| 2 | 247 | 13,000 | 480 | 78 |
| 3 | 251 | 16,000 | 680 | 95 |
| 4 | 247 | 10,000 | 580 | 130 |
| 5 | 247 | 13,000 | 480 | 53 |
| 6 | 251 | 18,000 | 510 | 22 |
| 7 | 253 | 17,000 | 450 | 16 |
| 8 | 237 | 7,500 | 380 | 200 |
| 9 | 244 | 13,000 | 500 | 25 |
| 11 | 249 | 15,000 | 520 | 95 |
| 16 | 248 | 14,000 | 510 | 32 |
| 17 | 254 | 17,000 | 700 | 10 |

Run 18 to 25

One-hundred parts by weight of a polyester mentioned in Table 3, 6 parts by weight of sodium salt of ethylene- methacrylic acid copolymer (HI-MILAN1707, Mitsui Polychemical), 3 parts by weight of polyethylene glycol dimethyl ether (average molecular weight of polyethylene glycol moiety 1,500) and 0.7 part by weight of Irganox 1010 (Ciba-Geigy) were dried and mixed and the mixture was charged into the hopper of a 40 mm (dia.) extruding machine (Osaka Seiki Kosakusha, Model 8 VSE- 40-28). The mixture was melted and extruded at a cylinder temperature of 250°-270°-275°-275° C., the adapter temperature of 265° C. and a die temperature of 265° C. and the resulting strand was cooled with water and cut into pellets.

The pellets thus obtained were dried in a hot air current at 120° C. for 15 hours and, then, molded into testpieces with an injection molding machine (Nikko-Ankerberg, Model V-15-75) at a cylinder temperature of 240°-260°-275° C., a nozzle temperature of 280° C. and a mold temperature of 90° C.

TABLE 3

| | Run No. | | | | | | | |
|---|---|---|---|---|---|---|---|---|
| Copolyester | 18 A | 19 B | 20 C | 21 F | 22 G | 23 Polyethylene terephthalate | 24 Polyethylene terephthalate | 25 P |
| Tensile strength (kg/cm²) | 470 | 460 | 460 | 455 | 470 | 540 | 450 | 450 |
| Elongation at break (%) | 250 | 240 | 250 | 18 | 50 | 5 | 250 | 45 |
| Flexural strength (kg/cm²) | 750 | 760 | 800 | 750 | 720 | 960 | 810 | 730 |
| Flexural at strain break (%) | Not broken | Not broken | Not broken | Not broken | Not broken | 10 | Not broken | Not broken |
| Flexural modulus of elasticity (kg/cm²) | 21,700 | 22,300 | 23,000 | 24,000 | 23,000 | 26,200 | 23,800 | 23,000 |
| Heat distortion temperature (°C.) (18.6 kg/cm²) | 70 | 68 | 71 | 72 | 73 | 78 | 61 | 72 |

The properties of the moldings are shown in Table 3. The compositions according to the present invention invariably showed satisfactory moldability and gave moldings with an excellent surface gloss. Moreover, the moldings obtained from the compositions of the invention showed very high elongation values and, in the flexural test, showed large strains without being broken.

Runs 26 to 37

One-hundred parts by weight of a copolyester mentioned in Table 4, 8 parts by weight of sodium salt of ethylene- methacrylic acid copolymer (HI-MILAN Mitsui Polychemical), 3 parts by weight of polyethylene glycol dimethyl ether (average molecular weight of polyethylene glycol moiety 1,000), 0.7 part by weight of Irganox 1010 and 48 parts by weight of glass fiber (bundled chopped strand, 3 mm lengths, Nitto Boseki) were premixed and the composition was charged into the hopper of a 40 mm (dia.) extruding machine (Osaka Seiki Kosakusha, Model 8 VSE-40-28). The composition was melted and extruded at a cylinder temperature of 250°-275°-275°-275° C., an adapter temperature of 265° C. and a die temperature of 265° C. and the resulting strand was cooled with water and cut into pellets. The kneading and extrusion could be effected smoothly and pellets in which the glass fiber were uniformly dispersed were obtained.

The pellets thus obtained were dried in a hot air current of 120° C. for 15 hours and testpieces were prepared from the dried pellets using an injection molding machine (Nikko-Ankerberg, Model V-15-75) at a cylinder temperature of 240°-260°-280° C., a nozzle temperature of 280° C., and a mold temperature of 90° C.

The properties of the moldings are shown in Table 4. The elongation at break was measured by the between-gages method under ASTM D 638. The compositions according to the present invention invariably showed excellent moldability and gave moldings with a superior surface gloss. The compositions of the invention also showed high toughness, high heat distortion temperatures and high rigidity. In contrast, the moldings in Runs 32 to 37 were either low in both elongation at break and bending strain with consequent poor toughness or low in tensile strength, flexural strength and heat distortion temperature although they showed fairly high toughness.

Run 38

The molding procedure of Run 26 was repeated except that the sodium salt of ethylene-methacrylic acid copolymer was used in a proportion of 0.04 part by weight and the glass fiber in a proportion of 44.3 parts by weight.

The properties of the resulting moldings are shown in Table 4. The moldings were inferior in surface smoothness and poor in dimensional stability at annealing. It appeared that under the molding conditions used, the polyethylene terephthalate was not sufficiently crystallized. Further, despite the small proportion of the sodium salt of ethylene-methacrylic acid copolymer which is low in elasticity, the product was lower than the product of Run 26 in both tensile strength and flexural strength.

Run 39

The molding procedure of Run 26 was repeated except that the polyethylene glycol dimethyl ether was used in a proportion of 11 parts by weight and the glass fiber in a proportion of 50.7 parts by weight. The properties of the resulting molded product are shown in Table 4. The fluidity of the resin at molding was satisfactory and the surface smoothness of the product was also satisfactory. However, because of the high proportion of the plasticizer, the product was poor in toughness. Furthermore, bleeding of the plasticizer at annealing caused a loss of surface gloss.

Run 40

The molding procedure of Run 26 was repeated except that the glass fiber was used in a proportion of 46.0 parts by weight and the polyethylene glycol dimethyl ether was omitted. The molded product had a corrugated surface and since it was of no practical value, determination of properties was not performed.

Run 41

The procedure of Run 26 was repeated except that, in the manufacture of pellets by extrusion, the glass fiber was used in a proportion of 44.4 parts by weight and the sodium salt of ethylene-methacrylic acid copolymer was replaced with 0.3 part by weight of sodium stearate, and testpieces were prepared from the resulting pellets.

The properties of the testpieces are shown in Table 4. Each testpiece had a satisfactory surface gloss and a high degree of toughness.

Run 42

The molding procedure of Run 26 was repeated except that the sodium salt of ethylene-methacrylic acid copolymer was used in a proportion of 3 parts by weight and the glass fiber in a proportion of 45.6 parts by weight. The properties of the resulting molded product are shown in Table 4. Like the product of Run 26, the above product was excellent in surface smoothness and toughness.

Run 43

The procedure of Run 26 was repeated except that copolyester N was used in lieu of copolyester A and the proportion of glass fiber was changed to 43.0 parts by weight.

The product had high toughness but showed a low heat distortion temperature, failing to accomplish the objects of the present invention.

Run 44

A commercial polybutylene terephthalate resin (containing 30 weight % of glass fiber) was dried by heating at 120° C. for 15 hours and testpieces were prepared by means of an injection molding machine at a cylinder temperature of 235°-255°-255° C., a nozzle temperature of 255° C., and a mold temperature of 60° C.

The properties of the resulting product are shown in Table 4. It is clear that the composition according to the present invention assures the toughness comparable to that of a polybutylene terephthalate resin. On the other hand, whereas the thermal deformation temperature of polybutylene terephthalate resin containing 30 weight % of glass fiber was about 210° C, the composition according to the present invention (containing 30 weight % of glass fiber) showed a high value of 225° C. or higher.

TABLE 4

| Run No. | 26 | 27 | 28 | 29 | 30 | 31 | 32 | 33 | 34 | 35 | 36 |
|---|---|---|---|---|---|---|---|---|---|---|---|
| Polyester | A | B | C | E | J | L | F | G | H | I | M |
| (parts by weight) | 100 | 100 | 100 | 100 | 100 | 100 | 100 | 100 | 100 | 100 | 100 |
| Sodium salt of ethylene-methacrylic acid copolymer (parts by weight) | 7 | 7 | 7 | 7 | 7 | 7 | 7 | 7 | 7 | 7 | 7 |
| Sodium stearate (parts by weight) | — | — | — | — | — | — | — | — | — | — | — |
| Polyethylene glycol dimethyl ether (parts by weight) | 3 | 3 | 3 | 3 | 3 | 3 | 3 | 3 | 3 | 3 | 3 |
| Irganox 1010 (parts by weight) | 0.3 | 0.3 | 0.3 | 0.3 | 0.3 | 0.3 | 0.3 | 0.3 | 0.3 | 0.3 | 0.3 |
| Glass fiber (parts by weight) | 48 | 48 | 48 | 48 | 48 | 48 | 48 | 48 | 48 | 48 | 48 |
| Appearance of moldings | o | o | o | o | o | o | o | o | o | o | o |
| Tensile strength (kg/cm$^2$) | 1,300 | 1,200 | 1,300 | 1,250 | 1,250 | 1,200 | 1,270 | 1,200 | 1,150 | 1,300 | 1,100 |
| Elongation at break (%) | 3.3 | 3.2 | 3.4 | 3.2 | 3.4 | 4.0 | 2.0 | 2.0 | 3.8 | 1.9 | 3.8 |

TABLE 4-continued

| | | | | | | | | | | | |
|---|---|---|---|---|---|---|---|---|---|---|---|
| Flexural strength (kg/cm²) | 2,000 | 1,900 | 1,970 | 1,800 | 1,900 | 1,750 | 1,850 | 1,750 | 1,600 | 1,820 | 1,500 |
| Flexural strain at break (%) | 3.5 | 3.6 | 3.5 | 3.3 | 3.5 | 4.2 | 2.1 | 2.1 | 3.5 | 2.2 | 3.6 |
| Flexural modulus of elasticy (10⁴ kg/cm²) | 9.0 | 7.8 | 8.2 | 7.3 | 9.0 | 7.0 | 8.7 | 8.8 | 6.5 | 7.5 | 7.8 |
| Izod impact strength (kg · cm/cm notched, ⅛ inch thick) | 10.0 | 10.0 | 10.5 | 9.5 | 10.5 | 11.4 | 7.4 | 7.8 | 10.0 | 7.4 | 10.5 |
| Heat distortion temperature (°C.) (load: 18.6 kg/cm²) | 228 | 226 | 230 | 226 | 230 | 225 | 230 | 233 | 210 | 222 | 200 |

| Run No. | 37 | 38 | 39 | 40 | 41 | 42 | 43 | 44 |
|---|---|---|---|---|---|---|---|---|
| Polyester (parts by weight) | Polyethylene terephthalate 100 | A 100 | A 100 | A 100 | A 100 | A 100 | N 100 | Polyethylene terephthalate 100 |
| Sodium salt of ethylene-methacrylic acid copolymer (parts by weight) | 7 | 0.04 | 7 | 7 | — | 3 | — | |
| Sodium stearate (parts by weight) | — | — | — | — | 0.3 | — | — | |
| Polyethylene glycol dimethy ether (parts by weight) | 3 | 3 | 11 | — | 3 | 3 | — | |
| Irganox 1010 (parts by weight) | 0.3 | 0.3 | 0.3 | 0.3 | 0.3 | 0.3 | 0.3 | |
| Glass fiber (parts by weight) | 48 | 44.3 | 50.7 | 46.0 | 44.4 | 45.6 | 43.0 | (30 weights %) |
| Appearance of moldings | o | x | o | x | o | o | o | o |
| Tensile strength (kg/cm²) | 1,400 | 1,150 | 1,250 | | 1,350 | 1,250 | 1,250 | 1,300 |
| Elongation at break (%) | 1.8 | 2.2 | 1.9 | | 1.9 | 3.4 | 3.4 | 3.3 |
| Flexural strength (kg/cm²) | 2,100 | 1,700 | 1,450 | | 1,930 | 1,900 | 1,600 | 1,900 |
| Flexural strain at break (%) | 2.3 | 2.3 | 2.0 | | 1.8 | 3.2 | 3.7 | 3.6 |
| Flexural modulus of elasticity (10⁴ kg/cm²) | 10.4 | 8.3 | 6.2 | | 9.3 | 8.5 | 7.5 | 9.0 |
| Izod impact strength (kg · cm/cm notched, ⅛ inch thick) | 7.4 | 7.5 | 7.4 | | 9.5 | 10.0 | 9.5 | 9.0 |
| Heat distortion temperature (°C.) (load: 18.6 kg/cm²) | 235 | 228 | 210 | | 227 | 228 | 206 | 210 |

Runs 45 to 54

One-hundred parts of each copolyester indicated in Table 5 and a predetermined amount of sodium salt of ethylene-methacrylic acid copolymer (an ionomer, HIMILAN 1856, Mitsui Polychemical) were thoroughly dried in a hot air current and mixed with 1/10 of the amount of ionomer of Phosphite®168 (Ciba-Geigy) as an antioxidant. The resulting composition was charged into the hopper of a 30 mm (dia.) two-axis extruding machine (Plastic Kogaku Kenkyusho) and melted and extruded at a cylinder temperature of 190°- 270°-280°-285° C. (from the hopper side), the adapter temperature of 285° C. and the die temperature of 275° C. to give a strand which was then cut into pellets.

The pellets thus obtained were dried at 120° C. for 12 hours and, then, preheated in a hot press with a 3 mm spacer at 280° C. for 5 minutes and, then, pressed at the pressure of 50 kg/cm² for 5 minutes. The pressed product was further pressed with a press at 150° C. for 4 minutes and, then, cooled in a cooling press for thorough crystallization to give a sheet with a thickness of about 3 mm. Testpieces were cut out from the sheet and the Izod impact strength (notched; ASTM D 256) was measured. The result is shown in Table 5.

The presence of at least 5 parts by weight of the ionomer assured a high impact strength.

The compositions according to the invention as prepared by varying the sort, molecular weight and proportion of the aliphatic dicarboxylic acid and poly(tetramethylene oxide)glycol in the copolyester invariably showed high impact strength values. The moldings obtained were allowed to stand in an air bath at 150° C. for 7 days and their Izod impact strengths were determined. The results are shown in Table 5.

Despite the prolonged exposure to a high temperature, the moldings retained high impact strengths. Moreover, the moldings had satisfactory surfaces.

Runs 55 to 62

Copolyesters were produced under various conditions, namely without addition of an aliphatic dicarboxylic acid (copolyester F, Run 55), without addition of poly(tetramethylene oxide)glycol (copolyester G, Run 56), addition of an excess thereof (copolyester H, run 57), addition of an aliphatic dicarboxylic acid with a small carbon number (copolyester I, Run 58) and addition of an excess of aliphatic dicarboxylic acid (copolyester O, Run 59), and each copolyester was molded in the same manner as Run 48. Izod impact strength data on the products are shown in Table 5.

The incorporation of a ionomer invariably resulted in an improved impact strength after molding but when the molded products were exposed to high temperature for a long time, they showed a large variation in impact strength probably due to local degradation, thus lacking in the stability of quality. It is thus clear that a stable and high impact strength can be obtained only with compositions containing a copolyester in which the sort and amount of aliphatic dicarboxylic acid and the amount of poly(tetramethylene oxide)glycol are each within the range of the present invention.

Run 60

The procedure of Run 48 was repeated except that a polyethylene terephthalate with an intrinsic viscosity of 0.74 dl/g was used in lieu of the copolyester and the impact strength of the resulting product was determined. The result is shown in Table 5.

In the case of unmodified polyethylene terephthalate, the incorporation of an ionomer results in some improvement in impact strength but a marked reduction in shaped article showed a marked decrease when it was exposed to high temperature for a long time.

Runs 63 to 65

Using an ethylene-methacrylic acid copolymer zinc salt (trade name, HI-MILAN 1855, Mitsui Polychemical) as the ionomer, shaped articles were manufactured in the same manner as Runs 48, 50 and 51, respectively. These articles were white without a yellow cast. Impact strength data on these shaped articles is shown in Table 6.

When allowed to remain in an air bath at 150° C. for 7 days, the articles remained substantially uncolored.

TABLE 5

| | | | | Izod impact test, notched, kg · cm/cm | | |
|---|---|---|---|---|---|---|
| Run No. | Copolyester | Ionomer | parts | Immediately after molding | After 7 days at 70° C. | After 7 days at 150° C. |
| 45 | A | HI-MILAN 1856*(1) | 1 | 3 | — | — |
| 46 | A | " | 7.5 | 26 | — | — |
| 47 | A | " | 15 | 38 | — | — |
| 48 | A | " | 30 | 110 | 105 | 96 |
| 49 | A | " | 45 | 105 | — | — |
| 50 | J | " | 30 | 105 | 100 | 90 |
| 51 | C | " | 30 | 115 | 113 | 102 |
| 52 | D | " | 30 | 130 | 124 | 105 |
| 53 | E | " | 30 | 90 | 90 | 60 |
| 54 | M | " | 30 | 95 | 93 | 85 |
| 55 | F | " | 30 | 90 | 16–35*(3) | 13 |
| 56 | G | " | 30 | 85 | 17–42 | 12 |
| 57 | H | " | 30 | 95 | 20–60 | 15 |
| 58 | I | " | 30 | 83 | 15–30 | 10 |
| 59 | O | " | 30 | 93 | 24–70 | 17 |
| 60 | Polyethylene terephthalate | " | 30 | 76 | 14 | 13 |
| 61 | A | Yukalon X-190-1*(2) | 30 | 15 | — | — |
| 62 | P | HI-MILAN 1856 | 30 | 90 | 20–60*(3) | 13 |

*(1)Sodium salt of ethylene-methacrylic acid copolymer (Mitsui Polychemical)
*(2)Ethylene-ethyl acrylate copolymer (Mitsubishi Petrochemical)
*(3)The range of values is shown because of a large variation of data.

impact strength occurred when the product was exposed to high temperature for a long time.

Run 61

A shaped article was manufactured in the same manner as Run 47 except that a ethylene-ethyl acrylate copolymer (Yukalon X-190-1, Mitsubishi Petrochemical) was used in lieu of the ionomer. The impact strength data on the article are given in Table 5.

The mere use of a polymer not having formed a metal salt failed to give a high impact strength.

Run 62

The procedure of Run 48 was repeated except that poly(ethylene oxide)glycol-modified polyester P was used as the copolyester. The impact strength of the

Runs 66 to 69

Shaped articles were manufactured in the same manner as Run 63 except that the kind of copolyester was changed. The impact strength values of the shaped articles are given in Table 6. When such other kinds of copolyesters were used, the impact strength was high at the stage immediately after molding but experienced a marked decrease on prolonged exposure to high temperature. In Run 69 in which polyethylene terephthalate was used in lieu of the copolyester, the impact strength was very low even at the stage immediately after molding.

TABLE 6

| | | | | Izod impact test, notched, kg · cm/cm | | |
|---|---|---|---|---|---|---|
| Run No. | Copolyester | Ionomer | parts | Immediately after molding | After 7 days at 70° C. | After 7 days at 150° C. |
| 63 | A | HI-MILAN 1855 | 30 | 127 | 110 | 32 |
| 64 | J | " | 30 | 94 | 88 | 25 |
| 65 | C | " | 30 | 105 | 95 | 27 |
| 66 | F | " | 30 | 92 | 13 | — |
| 67 | G | " | 30 | 100 | 18 | — |
| 68 | I | " | 30 | 97 | 12 | — |
| 69 | Polyethylene terephthalate | " | 30 | 18 | — | — |

Runs 70 to 82

In the same manner as Run 45, the copolyester, ionomer and glass fiber were blended as shown in Table 7 to prepare resin compositions. Using these compositions, testpieces were prepared and the impact strength of each testpiece was determined. The results are shown in Table 7.

When the proportion of the ionomer was not less than 5 parts by weight, high impact strength values were obtained.

The compositions according to the present invention invariably gave testpieces showing high impact strength values. These testpieces were allowed to rest in an air bath at 150° C. for 7 days and the Izod impact strength of each testpiece was determined. The results are shown in Table 7. Despite the prolonged exposure to high temperature, these testpieces retained high impact strength values. The flexual strength of each testpiece was also determined in accordance with ASTM D 790. It was found that the products according to the present invention invariably showed high flexural strength values.

When the proportion of the ionomer was one part by weight outside of the scope of the invention, the impact strength of the resulting shaped article was inadequate (Run 70).

Runs 83 to 87

Shaped articles were manufactured in the same manner as Run 73 except under the varied conditions, namely without addition of an aliphatic dicarboxylic acid (copolyester F), without addition of poly(tetramethylene oxide)glycol (copolyester G), with addition of an excess of poly(tetramethylene oxide)glycol (copolyester H), with addition of an aliphatic dicarboxylic acid with a small carbon number (copolyester I) and with addition of an excess of aliphatic dicarboxylic acid (copolyester 0). The Izod impact strength and flexual strength were determined. The results are shown in Table 7.

Comparison of Run 73 with Runs 83 to 87 shows that the latter products are inferior to the products of Run 73 in both the impact strength immediately after molding and that after 7 days at 150° C. Particularly the products of Run 85 to 87 are fairly low in flexual strength.

Run 88

A shaped article was manufactured in the same manner as Run 73 except that a polyethylene terephthalate with an intrinsic viscosity of 0.74 dl/g was used in lieu of the copolyester, and its impact strength was determined. The result is shown in Table 7.

In the case of the unmodified polyethylene terephthalate, the incorporation of an ionomer failed to achieve an improvement in impact strength.

Run 89

A shaped article was manufactured in the same manner as Run 73 except that an ethylene-ethyl acrylate copolymer (Yukalon X-190-1, Mitsubishi Petrochemical) was used in lieu of the ionomer, and its impact strength was determined. The results are shown in Table 7.

The use of a polymer not having formed a salt failed to achieve a high impact strength.

TABLE 7

| Run No. | Copolyester | Ionomer | parts | Glass fiber, wt. % | Izod impact test, notched, kg · cm/cm Immediately after molding | After 7 days at 150° C. | Flexural strength kg/cm² |
|---|---|---|---|---|---|---|---|
| 70 | A | HI-MILAN 1856*(1) | 1 | 30 | 5 | — | 1.80 |
| 71 | A | " | 10 | 30 | 12 | 12 | 1.80 |
| 72 | A | " | 20 | 30 | 15 | 14 | 1.80 |
| 73 | A | " | 30 | 30 | 21 | 17 | 1.80 |
| 74 | A | " | 30 | 20 | 15 | — | 1.55 |
| 75 | A | " | 30 | 40 | 24 | — | 2.10 |
| 76 | A | " | 30 | 3 | 12–33 | — | .40 |
| 77 | A | " | 45 | 30 | 19 | — | 1.60 |
| 78 | J | " | 30 | 30 | 18 | 17 | 1.70 |
| 79 | C | " | 30 | 30 | 17 | 15 | 1.85 |
| 80 | D | " | 30 | 30 | 22 | 18 | 1.75 |
| 81 | E | " | 30 | 30 | 17 | 16 | 1.80 |
| 82 | M | " | 30 | 30 | 20 | 17 | 1.70 |
| 83 | F | " | 30 | 30 | 12 | 10 | 1.75 |
| 84 | G | " | 30 | 30 | 11 | 10 | 1.70 |
| 85 | H | " | 30 | 30 | 14 | 11 | 1.55 |
| 86 | I | " | 30 | 30 | 12 | 11 | 1.65 |
| 87 | O | " | 30 | 30 | 13 | 11 | 1.50 |
| 88 | Polyethylene terephthalate | — " | 30 | 30 | 11 | 10 | 1.70 |
| 89 | A | Yukalon X-190-1*(2) | 30 | 30 | 9 | — | 1.70 |

*(1)Sodium salt of ethylene-methacrylic acid copolymer (Mitsui Polychemical)
*(2)Ethylene-methyl acrylate copolymer (Mitsubishi Petrochemical)

What is claimed is:

1. A moldable copolyester consisting essentially of structural units of the following formulas (I) to (IV):

(I)

(II)

−[O−CH₂−CH₂−O−] (III)

−[O−(CH₂CH₂CH₂CH₂−O)ₙ−] (IV)

wherein R is a divalent group available on elimination of carboxyl groups from an aliphatic dicarboxylic acid containing 18–54 carbon atoms, and n is an integer equal to 8 through 84, wherein (I) is bound to (III) and/or (IV), (II) is bound to (III) and/or (IV), and the sum of moles of (I) and (II) is substantially equal to the sum of moles of (III) and (IV), and unit (II) is contained in a proportion of from 0.2 to 10 moles per 100 moles of unit (I) and the repeating unit —(CH₂CH₂CH₂CH₂O)— of (IV) is contained in a proportion of from 1 to 20 moles per 100 moles of unit (I).

2. A copolyester according to claim 1 wherein (II) is contained in a proportion of 0.2 to 5 moles to 100 moles of (I).

3. A copolyester according to claim 1 wherein the repeating unit —(CH₂CH₂CH₂CH₂O)— of (IV) is present in a proportion of 3 to 15 moles to 100 moles of (I).

4. A copolyester according to claim 1 wherein R in the structural unit of (II) is a divalent group available on elimination of carboxyl groups from at least one aliphatic dicarboxylic acid containing 16 to 54 carbon atoms.

5. A copolyester according to claim 4 wherein R in the structural unit of (II) is a divalent groups available on elimination of carboxyl groups from at least one dicarboxylic acid selected from the group consisting of octadecanedicarboxylic acid, dimer acids and hydrogenated dimer acids.

6. A copolyester according to claim 4 wherein R in the structural unit of (II) is a divalent group available on elimination of carboxyl groups from at least one dicarboxylic acid selected from the group consisting of dimer acids and hydrogenated dimer acids.

7. A copolyester according to claim 1 which exhibits an intrinsic viscosity of 0.5 to 1.5.

8. A shaped article fabricated from a copolyester according to claim 1.

* * * * *